United States Patent [19]
Kluczynski

[11] Patent Number: 5,256,496
[45] Date of Patent: Oct. 26, 1993

[54] TITANIUM-STEEL LAMINATE KNIFE

[76] Inventor: Mathew L. Kluczynski, 22018 Lemarsh St., Chatsworth, Calif. 91311

[21] Appl. No.: 792,606

[22] Filed: Nov. 15, 1991

[51] Int. Cl.⁵ ............................................. B32B 15/00
[52] U.S. Cl. ..................................... 428/661; 30/350
[58] Field of Search ............... 420/502, 501; 428/660, 428/661; 30/350

[56] References Cited

U.S. PATENT DOCUMENTS

| | | | |
|---|---|---|---|
| 3,060,557 | 10/1962 | Rostoker et al. | 428/661 |
| 3,854,891 | 12/1974 | Chivinsky | 428/660 |
| 4,624,897 | 11/1986 | Ito | 428/660 |
| 4,735,866 | 4/1988 | Moorhead | 420/502 |
| 4,883,745 | 11/1989 | Mizuhara | 420/502 |

FOREIGN PATENT DOCUMENTS

| | | | |
|---|---|---|---|
| 1156676 | 7/1986 | Japan | 420/501 |
| 244859 | 5/1969 | U.S.S.R. | 420/502 |
| 583737 | 12/1946 | United Kingdom | 420/502 |

OTHER PUBLICATIONS

Lunnerfjord, "A Steel Strip and a tool made thereof" Apr. 23, 1987 WO8702311, Sweden.
Engel, Improvement of Cutting edges by ion-plating with Ti carbide, Haerterei-Tech., Mitt 29(4) 859-62.
Lewis, W. J. et al., "Brazing Titanium to Titanium and to Mild and Stainless Steels" WADC Technical Report 52-313, part I, Nov. 1952.
Mitsubishi Metal K.K. "Pd-Containing Alloy for Soldering" Platinum Metals Review, 1988, 32(1) p. 44.

Primary Examiner—Deborah Yee

[57] ABSTRACT

A titanium-high carbon steel laminate composed of two outer layers of titanium with the steel in the middle. The steel being heat-treatable to very high hardness and the outer titanium layers providing strength and corrosion resistance. The laminate is bonded together by a brazing process. The brazing or filler material may be of various compositions. This laminate is invented for the purpose of knife and similar cutting tool manufacture.

1 Claim, 1 Drawing Sheet

TITANIUM-STEEL LAMINATE KNIFE

BACKGROUND OF THE INVENTION

In the production of knives and other cutting tools it has always been a challenge to produce a blade which would be extremely hard and at the same time tough with good elongation properties.

The hardness is, of course, required or is desirable to maintain a sharp cutting edge with prolonged usage. Many steels are available which can be heat-treated to very high hardness; however as soon as the maximum hardness is obtained the material becomes brittle. The cutting edge can easily chip or the blade can break. This invention covers a process(es) and material selection which eliminates this problem.

Many attempts were made to laminate, by brazing, low carbon stainless steels with heat-treatable materials. It is a known fact that steels which can be heat-treated to high hardness are alloys with high carbon content (approximately 1.0 %). During the high temperature brazing cycle the low carbon stainless absorbs the carbon from the high carbon steel.

This is defined as molecular carbon migration. With the carbon removed from the steel it can no longer be hardened and the laminate becomes useless.

The titanium to steel laminate does not have this problem since titanium does not readily absorb carbon. Therefore the inner steel layer can be heat-treated to any desired or max hardness and obviously the titanium provides the outer strength, corrosion resistance and excellent appearance.

SUMMARY OF THE INVENTION

The use of extremely tough space age material such as titanium to provide the stiffness and strength of a blade is advancing the state-of-the-art. This combined with the hardness of conventional steels which could not be effectively used alone produces a superior cutting element beneficial for many purposes.

DETAILED DESCRIPTION OF THE EMBODIMENT

Figure 1:
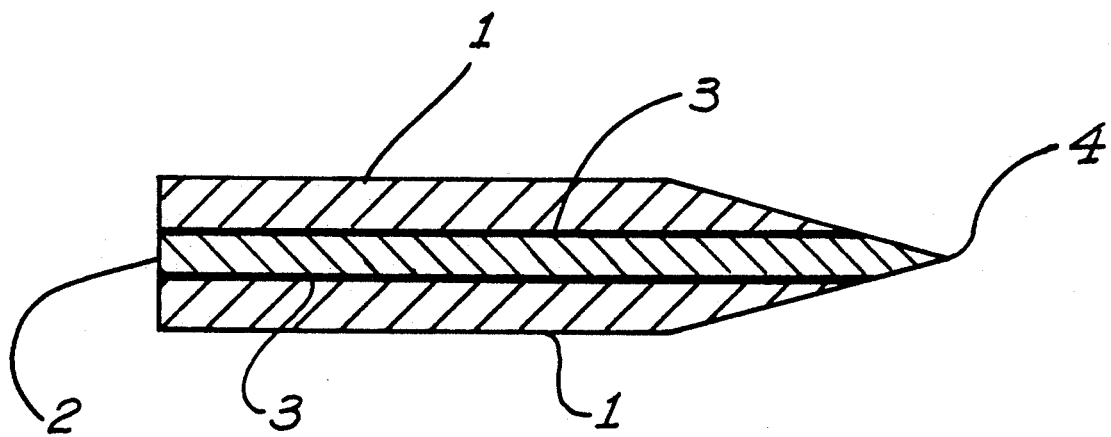
FIG. 1 is a cross-section of a laminated blade assembly. With the cutting edge exposed by grinding or machining, the size is arbitrary and can be scaled up and down to suit any particular size and shape of a knife or other cutting tool.

As shown on the drawing (FIG. 1) for the purpose of illustration the invention is a laminated cutting blade.

The laminate consists of two outer layers of titanium, reference no. 1, with an inner layer of high carbon steel, reference no. 2. The outer layers generally referred to as titanium are actually various alloys of titanium and the alloying elements may appear in various proportions. The common titanium alloying elements are as follows; however this claim is not limited to these alloying elements but it encompasses all titanium alloys where titanium is present in excess of 51 %.

Alloying elements:
Aluminum
Vanadium
Molybdenum
Manganese
Zirconium
Tin

The inner layer consists of high carbon steel. The steel may be of various compositions and for the purpose of this claim any steel which is capable of accepting heat-treat resulting in hardness of 56 R/C minimum on the Rockwell hardness scale is part of this embodiment. This inner layer forms the cutting edge, reference no. 4, which because of its hardness is superior to conventional blades. The inner layer is exposed only a small amount and is therefore protected by the titanium outer layers from chipping and/or breaking.

Reference no. 3 is the brazing material also referred to as the filler material.

Various compositions can be used and the brazing is accomplished in vacuum or controlled atmosphere at a minimum temperature of 1650° F. The lower limit of this temperature is critical since the laminated blade is hardened by application of 1450° F. to 1600° F. temperature followed by rapid cooling, after which the blade is tempered for stress relief purposes and to obtain the desired hardness. This heat-treat cycle does not affect nor weaken the braze joint.

Typical alloys used as the filler material are:
1) silver-palladium-copper
2) copper-silver
3) silver-nickel eutectic
4) copper This claim is not limited to these alloys alone but encompasses all techniques used to join titanium alloys with steel alloys.

I claim:

1. A knife made from a laminate consisting of two outside layers of pure titanium metal and one hardened, inner layer of steel having a hardness of 56 R/C minimum on the Rockwell hardness scale and wherein said inner layer forms the cutting edge.

* * * * *